United States Patent [19]

McKee

[11] 4,222,151
[45] Sep. 16, 1980

[54] APPARATUS FOR EXTRACTING FISH ROE

[75] Inventor: James A. McKee, Vancouver, Canada

[73] Assignee: The Canadian Fishing Co. Ltd., Vancouver, Canada

[21] Appl. No.: 38,609

[22] Filed: May 14, 1979

[51] Int. Cl.³ .............................................. A22C 25/14
[52] U.S. Cl. ......................................... 17/52; 17/59; 17/63
[58] Field of Search ................... 17/53, 55, 58, 59, 60, 17/63, 45, 52

[56] References Cited

U.S. PATENT DOCUMENTS

| | | | |
|---|---|---|---|
| 2,483,508 | 10/1949 | Smith | 17/60 |
| 3,793,676 | 2/1974 | Wiggins | 17/45 |
| 3,925,846 | 12/1975 | Leander | 17/60 |

*Primary Examiner*—Willie G. Abercrombie
*Attorney, Agent, or Firm*—Townsend and Townsend

[57] ABSTRACT

An apparatus for extracting fish roe comprises a tail holder for holding a tail portion of a fish and a head holder for holding a head portion of the fish. There is a first blade and a second blade and a mechanism for moving the blades towards the fish to pierce the fish near the back thereof and between the first and second holders. There is a mechanism for separating the first blade and the tail holder from the second blade and the head holder generally in the direction of the backbone of the fish to tear the head portion from the tail portion and expose roe within the fish. A method for exposing roe in fish comprises piercing the fish between the back and backbone with two adjacent blades and moving the blades away from each other generally parallel to the backbone of the fish to tear the fish into two portions and expose the roe.

19 Claims, 6 Drawing Figures

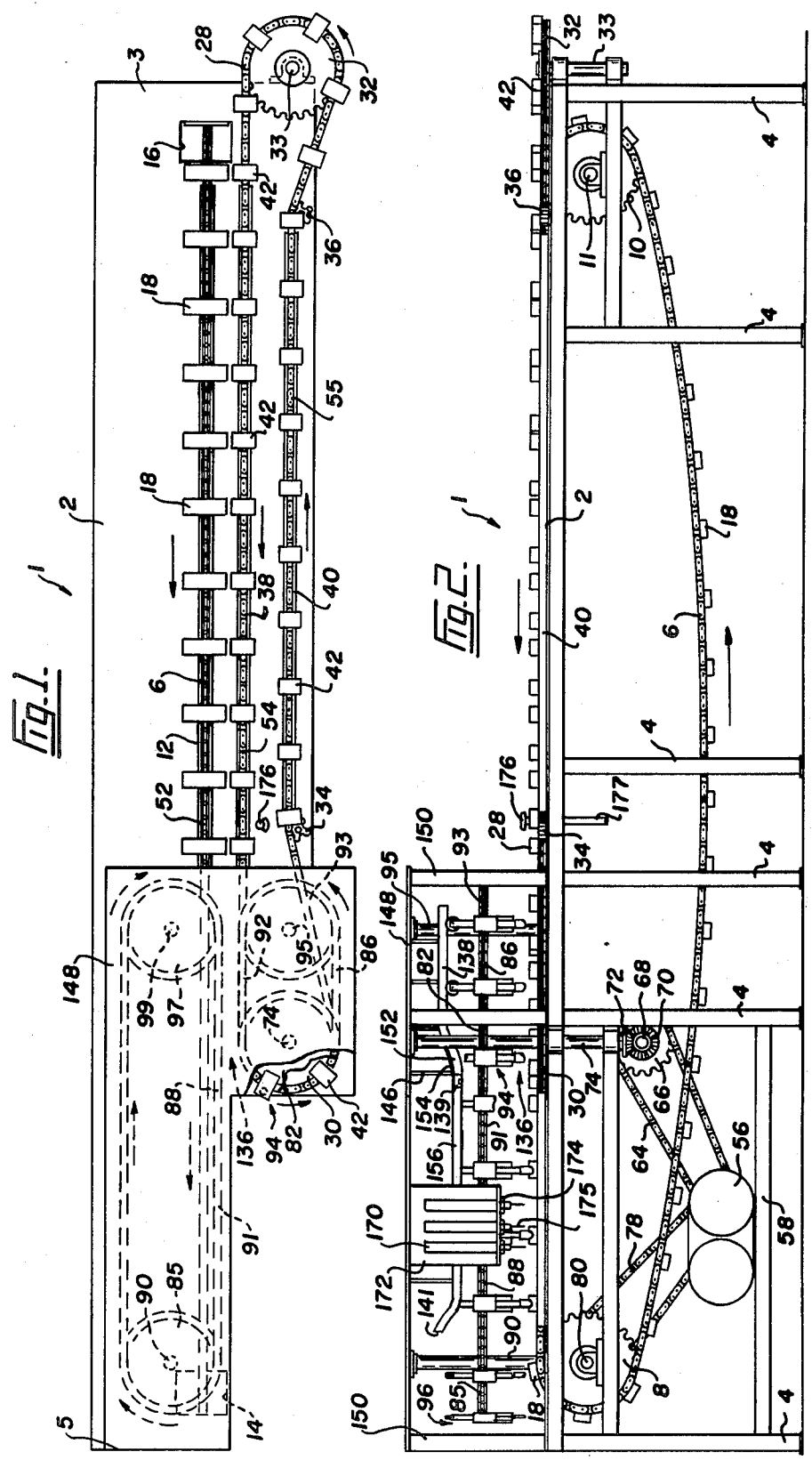

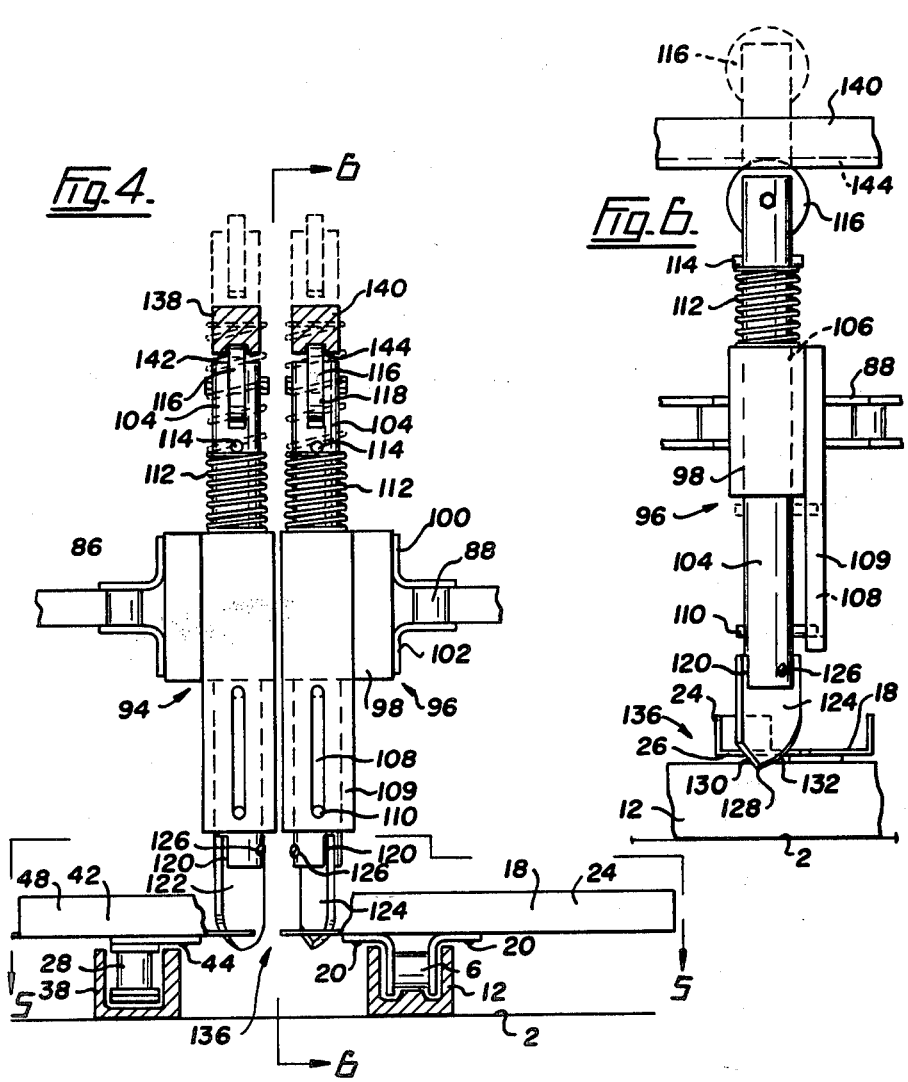

APPARATUS FOR EXTRACTING FISH ROE

BACKGROUND OF THE INVENTION

This invention relates to a method and an apparatus for extracting roe from fish.

The herring roe fishery is particularly lucrative since there is a large Japanese market for the herring roe which is used in the preparation of kazunoko, a Japanese delicacy. After the herring are caught, they are soaked in brine to firm up the roe. To remove the roe, workers physically grasp the head and tail of the fish and twist and pull them apart to tear the fish and expose the roe so it can be extracted. Exposing the roe is the difficult part; once the roe is exposed, it is relatively easy to extract.

Prior art roe extractors are available which comprise two circular knifes which make a V-shaped cut and cut the head off the herring. These machines are adaptations of herring filleting machines and have not been very effective or widely accepted.

SUMMARY OF THE INVENTION

According to one aspect of the invention, an apparatus for extracting fish roe comprises first means for holding a tail portion of a fish; second means for holding a head portion of a fish; a first blade and a second blade. There is means for moving the blades towards the fish to pierce the fish near the back thereof and between the first and second means. There is means for separating the first blade and the first means from the second blade and the second means generally in the direction of the backbone of the fish to tear the head portion from the tail portion and expose roe within the fish.

According to another aspect of the invention, a method of exposing roe in fish comprises positioning the fish within a first means for holding a tail portion of the fish and a second means for holding a head portion of the fish; piercing the fish between the back and the backbone of the fish and between the first means and the second means with two adjacent blades; and moving the blades and the first and second means away from each other generally parallel to the backbone of the fish to tear the fish into two portions and expose the roe.

An apparatus for exposing fish roe according to the invention offers distinct advantages when compared with the manual method of exposing fish roe or previously available machines. The apparatus is especially designed for this purpose and is not merely an adaptation of a filleting machine which limits the design parameters in creating a machine especially for this purpose. The apparatus is highly efficient in exposing roe and produces a much smaller percentage damaged roe that can be sold only for a smaller price.

In drawings which illustrate embodiments of the invention:

FIG. 1 is a top plan view of an apparatus for extracting fish roe according to an embodiment of the invention;

FIG. 2 is a side elevational view of the apparatus;

FIG. 4 is a rear elevational view of the blades and blade members for piercing the fish at the piercing position;

FIG. 5 is a side elevational view of a blade and blade member at the piercing position; and FIG. 6 is a top plan view of a head holder and tail holder and two blades at the piercing position.

DESCRIPTION OF THE PREFERRED EMBODIMENTS

Figure 3:
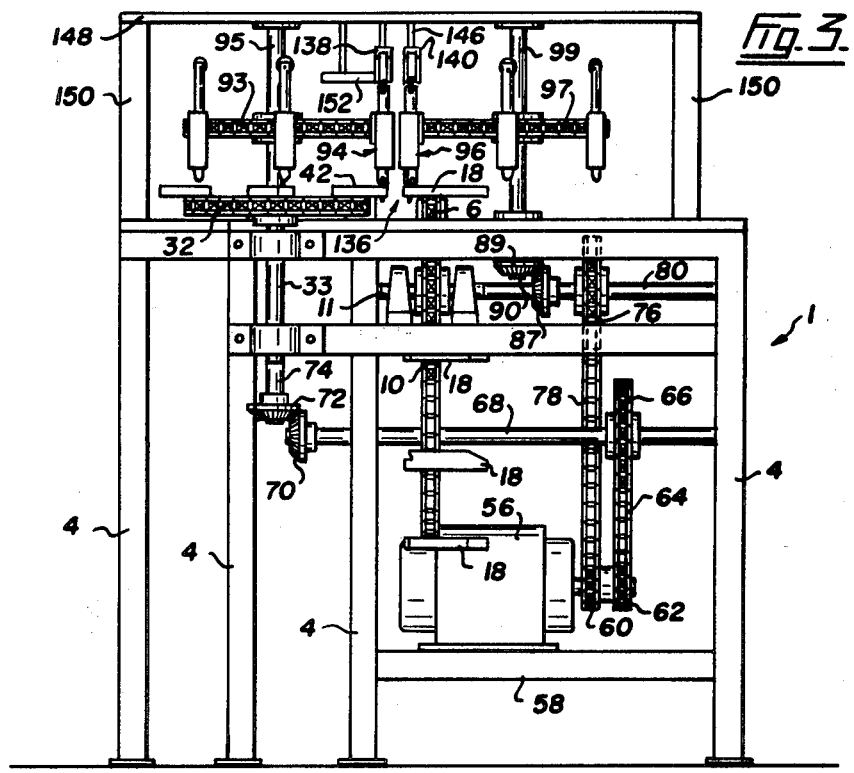
FIG. 3 is a rear elevational view of the apparatus.

The apparatus 1 for extracting fish roe as shown in FIGS. 1 to 6 of the drawings includes a conveyor surface 2 of steel plate and other structural steel components supported by a plurality of support legs 4. There is a tail holder conveyor 6 comprising a continuous chain conveyor in a vertical loop driven by sprocket 8 near the front end 5 of the apparatus and supported by idler sprocket 10 on a shaft 11 at the back end 3. High density, channel-shaped plastic guides 12 are provided for conveyor 6 along the surface 2. The conveyor passes through the surface 2 at a rectangular aperture 14 near the front end 5 and a similar aperture 16 near the back end 3 of the apparatus. As seen in better detail in FIG. 5, a plurality of first means for holding a tail portion 22 of a fish 25, or tail holders 18, are connected to the top of conveyor 6 by rivets 20. The tail holders 18 are generally shaped to conform to the tail portion 22 of the fish 25. The holders are of a sheet metal, such as a stainless steel, and channel-shaped with an upstanding peripheral flange 24. There is an angular notch 26 at the inner end and near the front of the tail holders for a purpose to be described later.

A head holder conveyor 28 comprises a continuous chain conveyor in a horizontal loop adjacent conveyor 6. There is a drive sprocket 30 at the front end of the conveyor 28 and an idler sprocket 32 on a shaft 33 at the back end. A pair of guide sprockets 34 and 36 keep the conveyor 28 in position on surface 2. A channel-shaped guide 38, similar to the guide 12 for conveyor 6, is provided for the forwardly moving portion 54 of conveyor 28 while a similar guide 40 is provided for the return portion 55. A plurality of second means for holding the head portion of a fish, or head holders 42, are connected to the top of conveyor 28 by rivets 44 as seen in FIGS. 4 and 5. Head holders 42 are generally in the shape of a head portion 46 of fish 25 and are channel-shaped with a flat bottom and upwardly extending peripheral flanges 48. An angular notch 50 is provided at the inner end and near the front of holders 42 for a purpose described below.

As seen in FIG. 1, the tail holders 18 of conveyor 6 and the head holders 42 of conveyor 28 are spaced-apart at equal intervals along the conveyors. The top, forwardly moving, portion 52 of conveyor 6 and the forwardly moving portion 54 of conveyor 28 are parallel. The holders are connected along the conveyors so that each tail holder 18 is adjacent a head holder 42.

Referring to FIG. 3, an electric motor 56 is mounted on motor mount 58 between four of the legs 4. The motor 56 is provided with an inner drive sprocket 60 and an outer drive sprocket 62 of the same size. A continuous chain 64 operatively connects sprocket 62 to the sprocket 66 mounted on drive shaft 68. A bevel gear 70 on shaft 68 meshes with an identical bevel gear 72 of the vertical drive shaft 74 which is connected to drive sprocket 30 of conveyor 28 as seen in FIG. 2. Sprocket 60 of motor 56 is connected to sprocket 76, which is identical in size to sprocket 66, by another continuous drive chain 78. Sprocket 76 is mounted on the horizontal drive shaft 80 which is connected to drive sprocket 8 of conveyor 6. By means of the mechanism just described, motor 56 drives conveyors 6 and 28 at the same speed and so that the forwardly moving portions 52 and 54 of the two conveyors move in the same direction. By means of this drive mechanism and the spacing of the cradles on the conveyors, the two conveyors are synchronized to bring corresponding head and tail holders together at the back end 3 of the apparatus 1 to the right of FIGS. 1 and 2.

The vertical drive shaft 74 shown in FIGS. 2 and 3 also is connected to a sprocket 82 above sprocket 30. Similarly, drive shaft 80 is connected to sprocket 85 through a pair of identical bevel gears 87 and 89 and a vertical drive shaft 90. Sprockets 82 and 85 are the drive sprockets for first blade conveyor 88 and second blade conveyor 86. Conveyor 86 has an idler sprocket 93 and shaft 95. Similarly, conveyor 88 has an idler sprocket 97 and shaft 99 at the end opposite sprocket 85. The inner or forwardly moving portion 91 of blade conveyor 88 is generally above conveyor 6, while the inner or forwardly moving portion 92 of conveyor 86 is generally above the inner portion 54 of conveyor 28.

A plurality of blade assemblies 94 are connected to conveyor 86 at intervals corresponding to the spacing of holders 18 and 42 on conveyors 6 and 28 respectively. A plurality of similar blade assemblies 96 are connected to conveyor 88. These blade assemblies are spaced-apart at equal intervals along both conveyors 86 and 88. The blade assemblies have a block 98 connected to the appropriate conveyor by upper and lower brackets 100 and 102. A vertical shaft 104 is slidably received through the vertical aperture 106 in the block. An elongate slot 108 in downward extension 109 of each block 98 and a guide pin 110 on each shaft 104 limits the upward and downward sliding of each shaft 104 within the appropriate block 98. A coil spring 112, compressed between the top of block 98 and pin 114 in shaft 104, urges the shaft upwardly. A cam follower or roller 116 is rotatably connected within the upper slot 118 of each shaft 104.

Both of the blade assemblies 94 and 96 have an upwardly extending slot 120 at the bottom of the shaft 104 for receiving second blades 122 and first blades 124 respectively. Screws 126 retain the blades in place. The blades 122 and 124 are generally identical with pointed bottoms 128, sharp front edges 130 and blunt back edges 132 as shown for one blade 124 in FIG. 6. The back edges are convexly curved adjacent the bottom 128 as seen in FIG. 6. As seen in FIG. 5, the sharp front edges 130 are directed away from the fish 25 when piercing the fish as will be described later. During this operation, as seen in FIG. 5, the front edges 130 of the blades 122 and 124 are adjacent each other and the back edges 132 extend away from each other. The two blades form a V-shape, opening towards the fish 25. As shown in FIG. 5, the blades 122 and 124 are positioned to pierce the fish 25 between the back 23 and the backbone 47 thereof.

The apparatus 1 has a piercing position 136 shown in FIGS. 1 to 6 inclusively. Piercing position 136 is between the top forwardly moving portion 52 of conveyor 6 and the forwardly moving portion 54 of conveyor 28 and is located adjacent sprocket 82 of blade conveyor 86 and sprocket 30 of head holder conveyor 28. Since portion 54 of head holder conveyor 28 and portion 92 of blade conveyor 86 move to the left from the point of view of FIGS. 1 and 2, both conveyors extend laterally away from tail holder conveyor 6 about horizontally oriented lower sprocket 30 and upper sprocket 82, respectively, adjacent piercing position 136. The positioning of sprockets 30 and 82 adjacent piercing position 136 provides means for separating the blades 122 from the blades 124, and for separating the head holders 42 from the tail holders 18, as the blade conveyors and the holder conveyors move past the piercing position 136.

Apparatus 1 also has means for moving the blades 122 and 124 downwardly towards the fish 25 adjacent piercing positon 136, to pierce the fish near the back 23 thereof and between a tail holder 18 and the corresponding head holder 42. This means comprises elongate cams 138 and 140 above the blade conveyors 86 and 88 respectively. The cams are suspended by elongate hangers 146 from the plate 148 held above surface 2 by a plurality of support legs 150. Cams 138 and 140 have elongate grooves 142 and 144 along the bottoms thereof for receiving rollers 116 of the blade assemblies 94 and 96 respectively. Cams 138 and 140 have corresponding portions 152 and 154 respectively which slope downwardly towards the front end 5 of apparatus 1 and piercing position 136. Cam 140 has a lower horizontal portion 156 extending forwardly from piercing position 136.

In operation, the upper portion 12 of tail holder conveyor 6, inner portion 54 of head holder conveyor 28, and the inner portions 91 and 92 of blade conveyors 86 and 88 all move towards the front end 5 of the apparatus 1 by means of the motor 56 and the drive train as already mentioned. Roe herring are positioned in corresponding pairs of head holders 42 and tail holders 18 near the back end 3 of the apparatus 1 in the position of the fish 25 shown in FIG. 5 so that the back 23 of the fish faces the front end 5 of the apparatus. The conveyors 6 and 28 move the holders and fish towards the piercing position 136. Simultaneously, blade assemblies 94 and 96 are moved by blade conveyors 86 and 88 so that, just as a head holder 42 and the corresponding tail holder 18 reach a position below sprockets 83 and 84, one of the blade assemblies 94 and one of the blade assemblies 96 are positioned above the head holder 42 and tail holder 18 respectively. This synchronization is achieved by equal spacing of the blade assemblies 94 along blade conveyor 86, blade assemblies 96 along blade conveyor 88, head holders 42 along head holder conveyor 28 and tail holders 18 along tail holder conveyor 6. As mentioned already, all of these conveyors move at the same speed. Consequently, each corresponding pair of blade assemblies 94 and 96 remain above a corresponding head holder 42 and tail holder 18 during movement towards the piercing position 136. When the rollers 116 of the blade assemblies 94 and 96 reach the downwardly extending portions 152 and 154 of the cams 138 and 140 respectively, the shafts 104, and blades 122 and 124, are pushed downwardly against the force of springs 112 by continued forward movement of the blade conveyors 86 and 88. The blades 122 and 124 are moved downwardly until they contact the fish 25 held by the two holders and they continue to move downwardly to pierce the fish until the blades are lowest at the piercing position 136. As the fish is pierced, the blunt back edges 132 of the blades 122 and 124 face the belly of the fish so the roe in the belly of the fish is not cut should the blades contact the roe during the piercing operation.

As seen in FIG. 5, blade 124 is more perpendicular to the direction of the backbone 47 of the fish 25 than the blade 122. As shown, blade 124 is at an angle of 25° with the direction of travel 160 of the conveyors while blade 122 is at an angle of 38°. As mentioned above, continued movement of head holder 42 and the corresponding blade assemblies 94 past the piercing position 136 and about sprockets 30 and 82, respectively, moves blades 122 and head holders 42 laterally away from the corresponding blades 124 and tail holders 18. Since the blades 122 and 124 have then pierced the fish 25, the fish is torn into the head portion 46, held within head holder 42 by blade 122, and a tail portion 22, held within tail holder 18 by blade 124. The blade 124 is more perpendicular to the backbone of the fish to provide a flatter surface for retaining the tail portion of the fish within the tail holder 18 while the head portion is torn away. As the head holder 42 and blade 122 continue to move about sprockets 30 and 82, the head portion of the fish is completely torn away from the tail portion. The head portions of the fish are then removed from the head holders 42 by a water jet from nozzle 176 and pipe 177.

The roe within the belly of the fish normally remains within the tail portion of the fish since a membrane attaches the roe to the tail portion. After the head portion of the fish has been removed and the roe exposed at the piercing position 136, the tail portion with the roe continues to move along conveyor 6 towards the front end 5 of the apparatus. The blades 124 are kept in the lower position to retain the tail portion of the fish within the tail holders 18 as rollers 116 of blade assemblies 96 move along the lower horizontal portion 156 of cam 140.

As shown in FIG. 2, a plurality of vertically oriented pneumatic cylinders 170 are connected to the plate 148 by a bracket 172. The cylinders have downwardly extending piston rods 174 with fingers 175 connected thereto. The fingers 175 comprise upwardly curved lengths of flat resilient metal. As the holders cradles approach the cylinders 170, air is supplied to the cylinders to move the fingers 175 downwardly to contact the belly of the fish. While the tail portion of the fish is held back by a downwardly extended blade 124, fingers 175 exert a force in the opposite direction to squeeze the roe from the belly of the fish.

Cam 138 has a front end 139 which curves laterally away from piercing position 136 above the perimeter of sprocket 82. Blades 122 are held down by cam 138 until the two portions of the fish are torn apart. Thereafter, the rollers 116 of the blade members 94 reach the end 139 of the cam 138 and are moved upwardly by the springs 112 once they clear the cam. Similarly, cam 140 has a forward end 141 located between cylinders 170 and the front end 5 of the apparatus. Once the roe has been removed by fingers 175, blades 124 are moved upwardly by springs 112 of blade assemblies 96 as the rollers 116 clear the forward end 141 of the cam 140.

I claim

1. An apparatus for extracting fish roe, comprising:
first means for holding a tail portion of a fish;
second means for holding a head portion of the fish;
a first blade;
a second blade;
means for moving the blades towards the fish to pierce the fish near the back thereof and between the first and second means; and
means for separating the first blade and the first means from the second blade and the second means generally in the direction of the backbone of the fish to tear the head portion from the tail portion and expose roe within the fish.

2. An apparatus as claimed in claim 1, the first and second means comprising tail and head holders for holding the portions of the fish.

3. An apparatus as claimed in claim 2, the blades having sharp front edges, directed away from the fish when the fish is pierced, and blunt back, edges so that the blades don't cut the roe when piercing the fish.

4. An apparatus as claimed in claim 3, the blades having pointed bottoms and convexly curved portions of the back edges adjacent the bottom, the blades being movable generally downwardly to pierce the fish.

5. An apparatus as claimed in claim 4, the front edges of the first and second blades being adjacent each other, and the back edges extending away from each other, when piercing the fish, to form a V-shape opening towards the fish.

6. An apparatus as claimed in claim 5, the first and second blades being positioned, when piercing the fish, to pierce the fish between the back and the backbone thereof.

7. An apparatus as claimed in claim 2, comprising a continuous chain conveyor with a plurality of said tail holders connected thereto; and a continuous chain conveyor with a plurality of said head holders connected thereto, the holders being spaced-apart at equal intervals along the holder conveyors and the holder conveyors being synchronized to bring the head holders and tail holders together near a back end of the apparatus for loading fish into the holders, corresponding said tail and head holders being movable together by the holder conveyors towards a piercing position where the fish are pierced.

8. An apparatus as claimed in claim 7, said means for separating comprising a portion of a second said holder conveyor extending laterally away from a first said holder conveyor adjacent the piercing position so corresponding tail and head holders are separated after the fish is pierced.

9. An apparatus as claimed in claim 8, comprising first and second blade conveyors generally above said first and second holder conveyors, respectively, near the piercing position, the means for separating comprising a portion of said second blade conveyor extending laterally away from said first blade conveyor above said second holder conveyor, a plurality of downwardly movable said blades being connected to the blade conveyors, the blade conveyors and holder conveyors being synchronized so that each said blade moves above one said holder towards the piercing position.

10. An apparatus as claimed in claim 9 the means for moving the blades towards the fish comprising an elongate cam above each said conveyor extending downwardly near the piercing position and cam followers connected to the blades.

11. An apparatus as claimed in claim 10, the blades being slidably connected to blade assemblies connected to the blade conveyors and comprising springs for biasing the blades upwardly, the cam followers comprising rollers at the top of the blade assemblies.

12. An apparatus as claimed in claim 2, the head and tail holders being shaped like the head and tail portions of a fish, respectively, with upwardly extending peripheral flanges.

13. An apparatus as claimed in claim 8, the first holder conveyor comprising the tail holder conveyor and the second holder conveyor comprising the head holder conveyor, the first blades being adjacent the tail holders and the second blades being adjacent the head holders, the first blades being more perpendicular to the direction of the backbone of the fish than the second blades.

14. An apparatus as claimed in claim 13, the first blades being at an angle of 25°, and the second blades being at an angle of 38°, with the direction of travel of the conveyors towards the piercing position when the blades pierce the fish.

15. A method of exposing roe in fish comprising:
positioning a fish within a first means for holding a tail portion of the fish and a second means for holding a head portion of the fish;
piercing the fish between the back and the backbone thereof and between the first and second means with two adjacent blades;
moving a second said blade and the second means away from a first said blade and the first means generally in a direction parallel to the backbone of the fish to tear the fish into two portions and expose the roe.

16. A method as claimed in claim 15 comprising directing sharp edges of the blades away from the backbone and directing dull edges towards the backbone as the fish is pierced so that the roe is not damaged.

17. A method as claimed in claim 16 comprising positioning the sharp edges of the blade adjacent each other and extending the dull edges away from each other as the fish is pierced so the blades form a V-shape opening towards the backbone of the fish.

18. A method as claimed in claim 17 comprising positioning one of the blades more perpendicular to the backbone of the fish than another said blade to retain one of the portions of the fish as another of the portions is torn away.

19. An apparatus as claimed in claim 9, the means for separating comprising upper and lower horizontally oriented sprockets adjacent said piercing position, said second blade conveyor extending about the upper sprocket and said head holder conveyor extending about the lower sprocket.

* * * * *